United States Patent
Newton

[11] Patent Number: 5,401,104
[45] Date of Patent: Mar. 28, 1995

[54] ROD GUIDE ASSEMBLY FOR ROTARY APPLICATIONS

[76] Inventor: Hille Newton, Box 6204, Bonnyville, Alberta, Canada, T9N 2G8

[21] Appl. No.: 181,244

[22] Filed: Jan. 13, 1994

[30] Foreign Application Priority Data

Feb. 5, 1993 [CA] Canada ............................ 2088932

[51] Int. Cl.$^6$ ............................................. F16C 33/74
[52] U.S. Cl. .................................. 384/126; 384/138; 384/149; 384/483; 384/202
[58] Field of Search ............... 384/126, 149, 150, 202, 384/138, 483

[56] References Cited

U.S. PATENT DOCUMENTS

| | | | |
|---|---|---|---|
| 2,806,748 | 9/1957 | Krotz et al. | 384/149 |
| 2,882,104 | 4/1959 | Guthans | 384/149 |
| 3,011,835 | 12/1961 | Guthans | 384/149 |
| 4,859,086 | 8/1989 | Viscusi | 384/126 |

*Primary Examiner*—Lenard A. Footland
*Attorney, Agent, or Firm*—Anthony R. Lambert

[57] ABSTRACT

A rod guide assembly for rotary applications has a stationary housing and a rotating housing. The stationary housing has an exterior, an interior, a first end and a second end. A primary stationary annular bushing is positioned in the interior at the first end of the stationary housing. The primary bushing has an interior bore. A bearing is provided having an outer race, and an inner race with an inner circumference. The outer race of the bearing is non-rotatably fixed to the stationary housing. A secondary annular rod guide is positioned in the interior at the second end of the stationary housing. Annular packing is disposed within the interior of the stationary housing to provide a fluid seal. The cylindrical rotating housing has an exterior, an interior, a first end and a second end. The exterior has a neck portion adjacent the second end. The neck is adapted to engage the inner circumference of the inner race of the bearing disposed at the first end of the stationary housing. The inner race of the bearing rotates with the rotating housing. Annular packing is disposed within the interior of the rotating housing to provide a fluid seal.

4 Claims, 1 Drawing Sheet

2

ROD GUIDE ASSEMBLY FOR ROTARY APPLICATIONS

The present invention relates to a rod guide assembly for rotary applications.

BACKGROUND OF THE INVENTION

The Applicant developed a rod guide assembly for rotary applications that utilized ball bearings having an annular outer race and an annular inner race with an inner circumference to accommodate a polished rod. When installing these rod guide assemblies in field locations, the applicant discovered that frequently the polished rods had marks, dents and other such imperfections. These imperfections prevented the polished rods from being accommodated within the close tolerances provided by the inner circumference of the inner race of the bearing.

SUMMARY OF THE INVENTION

What is required is a rod guide assembly for rotary applications, the installation of which is not limited by the polished rods ability to meet the close tolerances of the inner circumference of the inner race of the bearing.

According to the present invention there is provided A rod guide assembly for rotary applications which includes a cylindrical stationary housing and a cylindrical rotating housing. The stationary housing has an exterior, an interior, a first end and a second end. A primary stationary annular bushing is positioned in the interior at the first end of the stationary housing. The primary bushing has an interior bore. A bearing is provided having an outer race, and an inner race with an inner circumference. The outer race of the bearing is non-rotatably fixed to the stationary housing. A secondary annular rod guide is positioned in the interior at the second end of the stationary housing. Annular packing is disposed within the interior of the stationary housing. Means is provided for tightly compressing the annular packing such that a fluid seal is maintained with both a rotary polished rod extending through the interior of the stationary housing and the interior of the stationary housing. The cylindrical rotating housing has an exterior, an interior, a first end and a second end. The exterior has a neck portion adjacent the second end. The neck is adapted to engage the inner circumference of the inner race of the bearing disposed at the first end of the stationary housing. The inner race of the bearing rotates with the rotating housing. Annular packing is disposed within the interior of the rotating housing. Means is provided for tightly compressing the annular packing such that a fluid seal is maintained with both the rotary polished rod and the interior of the rotating housing.

The rod guide, as described, does not rely upon the close tolerance of the inner circumference of the inner race to centralize the polished rod. The polished rod is centralized within both the stationary housing and the rotating housing by packing. The problem previously encountered with tolerances of the inner circumference of the inner race of the bearing are met by having the stationary housing engage the outer race of the bearing and the rotating housing engage the inner circumference of the inner race.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
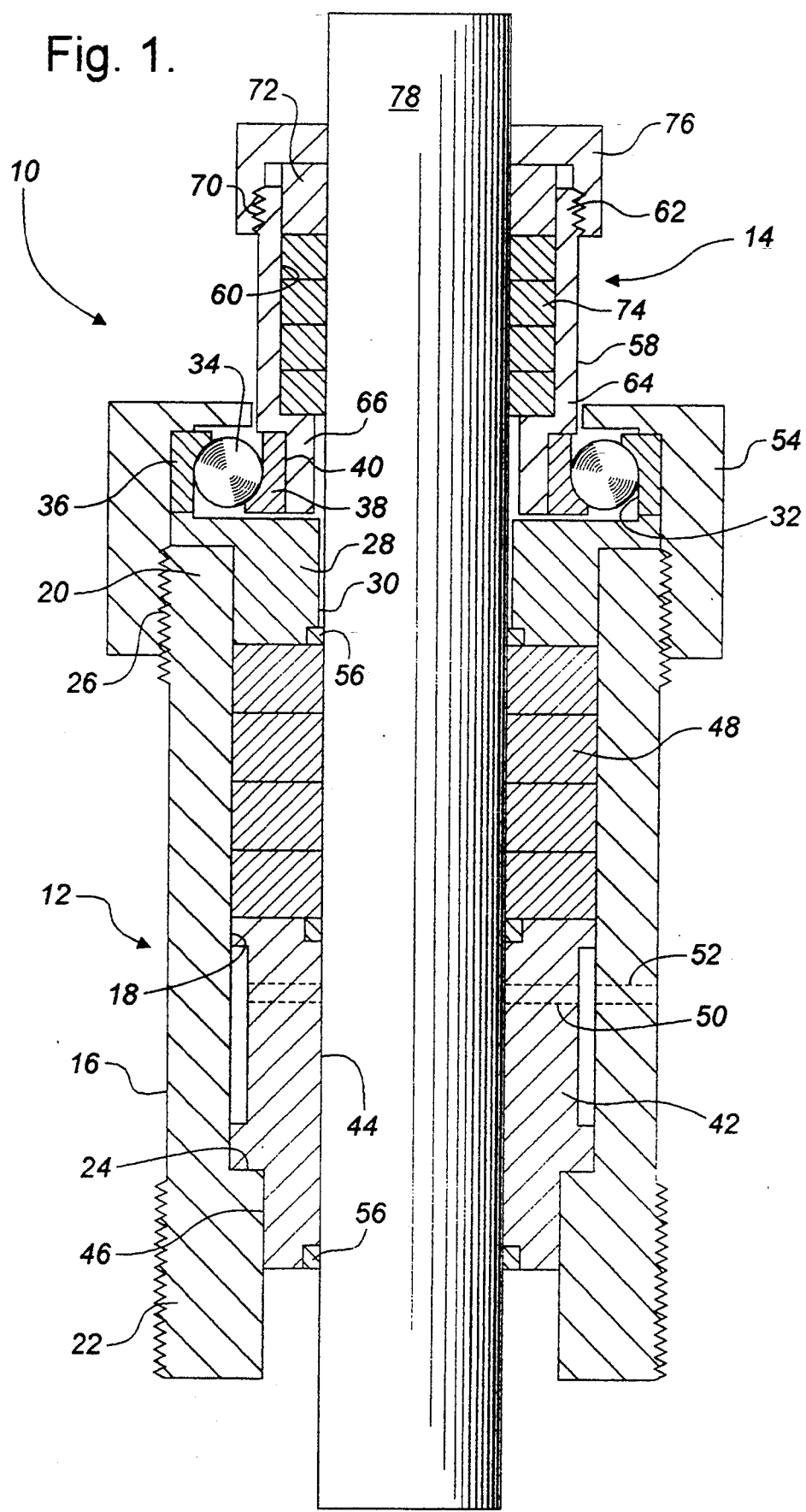
FIG. 1 is a longitudinal section view of a rod guide constructed in accordance with the teachings of the present invention.

The preferred embodiment, a rod guide assembly for rotary applications generally identified by reference numeral 10, will now be described with reference to FIG. 1.

Rod guide assembly 10 includes a cylindrical stationary housing 12 and a cylindrical rotating housing 14. Stationary housing 12 has an exterior 16, an interior 18, a first end 20 and a second end 22. A shoulder 24 is positioned on interior 18 adjacent second end 22. Threads 26 are positioned on exterior 16 adjacent first end 20. Bushings are used as rod guides. A primary stationary annular bushing 28 is positioned in interior 18 at first end 20 of stationary housing 12. Primary bushing 28 has an interior bore 30. A bearing 34 is provided having an outer race 36, and an inner race 38 with an inner circumference 40. A secondary stationary annular bushing 42 is positioned against shoulder 24 in interior 18 at second end 22 of stationary housing 12. Secondary bushing 42 has an interior bore 44 and a step down neck portion 46. Annular rope packing 48 is deposed between primary bushing 28 and secondary bushing 42. Lubrication ports 50 extend through secondary bushing 42 whereby lubrication is communicated to packing 48. Lubrication ports 50 communicate with a lubrication channel 52 extending through stationary housing 12. Lubrication channel 52 has a removable plug closure (not shown). An end cap 54 engages threads 26 at first end 20 of stationary housing 12. Bearing 34 is disposed in end cap 54. Outer race 36 of bearing 34 has a tight friction fit with end cap 54. This non-rotatably fixes outer race 36 of bearing 34 to stationary housing 12 when end cap 54 is engaged with threads 26. Annular seals 56 are positioned within interior bore 30 of primary bushing 28 and interior bore 44 of secondary bushing 42 to supplement packing 48. Cylindrical rotating housing 14 has an exterior 58, an interior 60, a first end 62 and a second end 64. Exterior 58 has a neck portion 66 adjacent second end 64. Neck 66 is adapted to engage inner circumference 40 of inner race 38 of bearing 34 disposed at first end 20 of stationary housing 12, such that inner race 38 of bearing 34 rotates with rotating housing 14. A shoulder 68 is positioned on interior 60 adjacent second end 64. Threads 70 are positioned on exterior 58 adjacent first end 62. An annular compression bushing 72 is positioned in interior 60 at first end 62 of rotating housing 14. Annular rope packing 74 is disposed within interior 60 of rotating housing 14. An end cap 76 engages threads 70 at first end 62 of rotating housing 14.

The use and operation of rod guide assembly 10 will now be described with reference to FIG. 1. Clearance is provided to extend a polished rod 78 through interior 18 of stationary housing 12 and interior 60 of rotating housing 14. With respect to stationary housing 12, interior bore 30 of primary bushing 28 and interior bore 44 of secondary bushing 44 are sized to accommodate polished rod 78 with whatever exterior imperfections it may have acquired through use. With respect to rotating housing 14, interior 60 at neck portion 66 is, similarly, sized to accommodate polished rod 78. Once polished rod 78 is in position end cap 54 of stationary housing 12 and end cap 76 of rotating housing 14 are threaded into position on threads 26 and 70, respectively. The tightening of end cap 54 serves as means for tightly compressing packing 48 between primary bushing 28 and secondary bushing 42, such that packing 48 maintains a fluid seal with both rotary polished rod 78 and interior 18 of stationary housing 12. Similarly, the tightening of end cap 76 serves as means for tightly compressing packing 74 between compression bushing 72 and shoulder 68 thereby maintaining a fluid seal with both rotary polished rod 78 and interior 60 of rotating housing 14. Upon rotation of polished rod 78, rotating housing 14 rotates. The rotation of rotating housing 14 is accommodated by inner race 38 of bearing 34.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. A rod guide assembly for rotary applications comprising:
   a. a cylindrical stationary housing, having an exterior, an interior, a first end and a second end;
   b. a primary stationary annular rod guide positioned in the interior at the first end of the stationary housing, the primary rod guide having an interior bore;
   c. a bearing disposed at the first end of the stationary housing, the bearing having an outer race, and an inner race with an inner circumference, means being provided for non-rotatably coupling the outer race of the bearing with the stationary housing;
   d. a secondary stationary annular rod guide positioned in the interior at the second end of the stationary housing;
   e. annular packing disposed within the interior of the stationary housing;
   f. means disposed at the first end of the stationary housing for tightly compressing the annular packing such that a fluid seal is maintained with both a rotary polished rod extending through the interior of the stationary housing and the interior of the stationary housing;
   g. a cylindrical rotating housing having an exterior, an interior, a first end and a second end, the exterior including a neck portion adjacent the second end, the neck being adapted to engage the inner circumference of the inner race of the bearing disposed at the first end of the stationary housing such that the inner race of the bearing rotates with the rotating housing;
   h. annular packing disposed within the interior of the rotating housing; and
   i. means for tightly compressing the annular packing such that a fluid seal is maintained with both the rotary polished rod and the interior of the rotating housing.

2. The rod guide for rotary applications as defined in claim 1, lubrication ports extending through one of the primary rod guide and the secondary rod guide whereby lubrication is communicated to the packing, the lubrication ports communicating with a lubrication channel extending through the stationary housing and having a removable closure.

3. A rod guide assembly for rotary applications comprising:
   a. a cylindrical stationary housing, having an exterior, an interior, a first end and a second end, a shoulder being positioned on the interior adjacent the second end, threads being positioned on the exterior adjacent the first end;
   b. a primary stationary annular bushing positioned in the interior at the first end of the stationary housing, the primary bushing having an interior bore;
   c. a secondary stationary annular bushing positioned against the shoulder in the interior at the second end of the stationary housing;
   d. annular packing disposed between the primary bushing and the secondary bushing;
   e. an end cap engaging the threads at the first end of the stationary housing, such that the end cap serves as means for tightly compressing the packing between the primary bushing and the secondary bushing such that the packing maintains a fluid seal with both a rotary polished rod extending through the interior of the stationary housing and the interior of the stationary housing;
   f. a bearing having an outer race, and an inner race with an inner circumference, the bearing being disposed in tight fitting relation within the end cap such that the outer race of the bearing remains non-rotatably fixed to the stationary housing;
   g. a cylindrical rotating housing having an exterior, an interior, a first end and a second end, the exterior including a neck portion adjacent the second end, the neck being adapted to engage the inner circumference of the inner race of the bearing disposed at the first end of the stationary housing such that the inner race of the bearing rotates with the rotating housing, a shoulder positioned on the interior adjacent the second end, threads positioned on the exterior adjacent the first end;
   h. an annular compression bushing positioned in the interior at the first end of the rotating housing;
   i. annular packing disposed within the interior of the rotating housing; and
   j. an end cap engaging the threads at the first end of the rotating housing, such that the end cap serves as means for tightly compressing the packing between the compression bushing and the shoulder thereby maintaining a fluid seal with both the rotary polished rod and the interior of the rotating housing.

4. A rod guide assembly for rotary applications comprising:
   a. a cylindrical stationary housing, having an exterior, an interior, a first end and a second end, a shoulder being positioned on the interior adjacent the second end, threads being positioned on the exterior adjacent the first end;
   b. a primary stationary annular bushing positioned in the interior at the first end of the stationary housing, the primary bushing having an interior bore;
   c. a secondary stationary annular bushing positioned against the shoulder in the interior at the second end of the stationary housing;
   d. annular packing disposed between the primary bushing and the secondary bushing;
   e. lubrication ports extending through the secondary bushing whereby lubrication is communicated to the packing, the lubrication ports communicating with a lubrication channel extending through the stationary housing and having a removable plug;

f. an end cap engaging the threads at the first end of the stationary housing, such that the end cap serves as means for tightly compressing the packing between the primary bushing and the secondary bushing such that the packing maintains a fluid seal with both a rotary polished rod extending through the interior of the stationary housing and the interior of the stationary housing;

g. a bearing having an outer race, and an inner race with an inner circumference, the bearing being disposed in tight fitting relation within the end cap such that the outer race of the bearing remains non-rotatably fixed to the stationary housing;

h. a cylindrical rotating housing having an exterior, an interior, a first end and a second end, the exterior including a neck portion adjacent the second end, the neck being adapted to engage the inner circumference of the inner race of the bearing disposed at the first end of the stationary housing such that the inner race of the bearing rotates with the rotating housing, a shoulder positioned on the interior adjacent the second end, threads positioned on the exterior adjacent the first end;

i. an annular compression bushing positioned in the interior at the first end of the rotating housing;

j. annular packing disposed within the interior of the rotating housing; and k. an end cap engaging the threads at the first end of the rotating housing, such that the end cap serves as means for tightly compressing the packing between the compression bushing and the shoulder thereby maintaining a fluid seal with both the rotary polished rod and the interior of the rotating housing.

* * * * *